United States Patent [19]

Motosugi et al.

[11] Patent Number: 4,462,349
[45] Date of Patent: Jul. 31, 1984

[54] FLOW CONTROL DEVICE OF A HELICALLY-SHAPED INTAKE PORT FOR USE IN A DIESEL ENGINE

[75] Inventors: Katsuhiko Motosugi, Toyota; Ituo Koga, Okazaki, both of Japan

[73] Assignee: Toyota Jidosha Kabushiki Kaisha, Aichi, Japan

[21] Appl. No.: 404,990

[22] Filed: Aug. 4, 1982

[30] Foreign Application Priority Data

Nov. 4, 1981 [JP] Japan .................. 56-163721

[51] Int. Cl.³ .............................. F01L 3/06
[52] U.S. Cl. ...................... 123/188 M; 123/308
[58] Field of Search ............ 123/188 M, 306, 308, 123/52 MB

[56] References Cited

U.S. PATENT DOCUMENTS 4,196,701  4/1980  Tamura et al. .............. 123/308
4,312,306  1/1982  Nakanishi et al. .......... 123/188 M
4,411,226 10/1983  Okumura et al. ........... 123/188 M

FOREIGN PATENT DOCUMENTS 2035940  1/1972  Fed. Rep. of Germany ...... 123/306
143289   8/1980  German Democratic Rep. .................... 123/188 M
52-127113 9/1977 Japan .
19945    2/1980  Japan ..................... 123/188 M

*Primary Examiner*—Craig R. Feinberg
*Assistant Examiner*—W. R. Wolfe
*Attorney, Agent, or Firm*—Parkhurst & Oliff

[57] ABSTRACT

A helically-shaped intake port comprising a helical portion formed around an intake valve, and a substantially straight inlet passage portion tangentially connected to the helical portion. A bypass passage is branched off from the inlet passage portion and connected to the helical portion. A rotary valve is arranged in the bypass passage and actuated by a vacuum operated diaphragm apparatus. The vacuum chamber of the diaphragm apparatus is selectively connected to the atmosphere or the suction pump driven by the diesel engine for opening the rotary valve when the level of load of the diesel engine is increased beyond a predetermined level.

12 Claims, 10 Drawing Figures

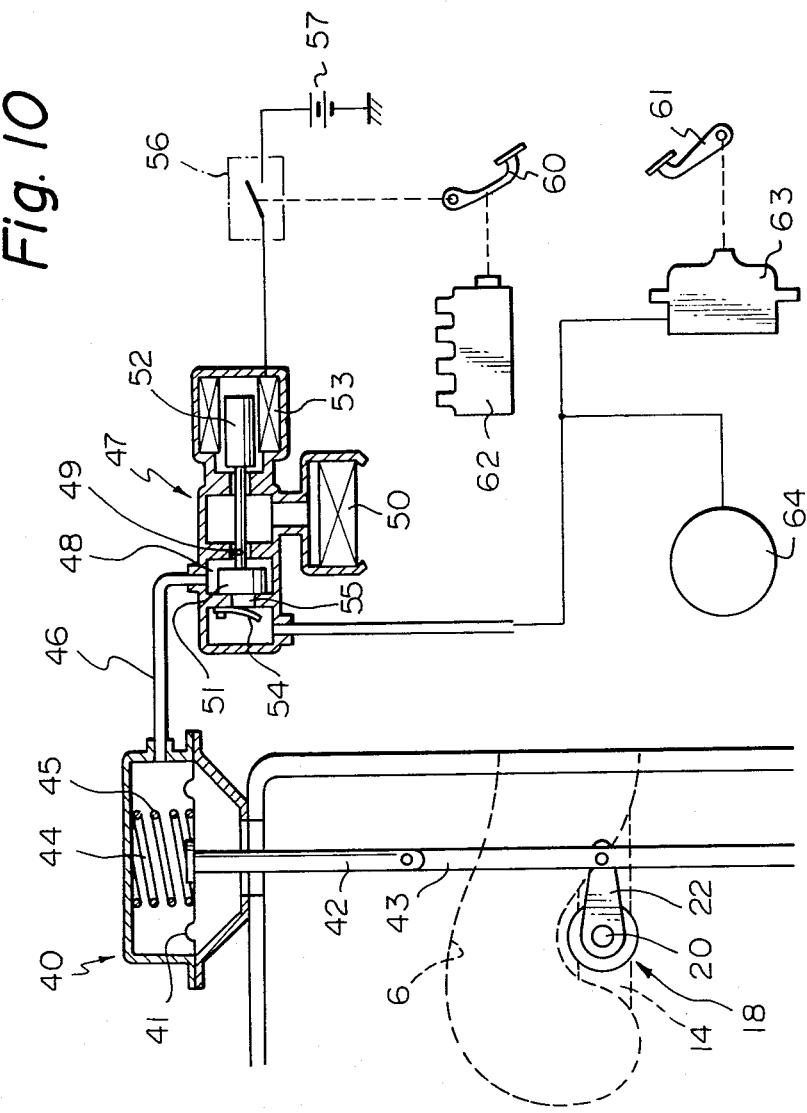

FLOW CONTROL DEVICE OF A HELICALLY-SHAPED INTAKE PORT FOR USE IN A DIESEL ENGINE

BACKGROUND OF THE INVENTION

The present invention relates to a flow control device of a helically-shaped intake port for use in a diesel engine.

A helically-shaped intake port normally comprises a helical portion formed around the intake valve of an engine, and a substantially straight inlet passage portion tangentially connected to the helical portion. However, if such a helically-shaped intake port is so formed that a strong swirl motion is created in the combustion chamber of an engine when the engine is operating at a low speed under a light load, that is, when the amount of air fed into the cylinder of the engine is small, since air flowing within the helically-shaped intake port is subjected to a great flow resistance, a problem occurs in that the volumetric efficiency is reduced when the engine is operating at a high speed under a heavy load, that is, when the amount of air fed into the cylinder of the engine is large.

In order to eliminate such a problem, the inventor has proposed a flow control device for use in a gasoline engine. In the flow control device, a bypass passage, branched off from the inlet passage portion and connected to the helix terminating portion of the helical portion, is formed in the cylinder head of an engine, and a normally closed type flow control valve, actuated by a vacuum operated diaphragm apparatus, is arranged in the bypass passage and opened under the operation of the diaphragm apparatus when the amount of air fed into the cylinder of the engine is larger than a predetermined amount. In this flow control device, when the amount of air fed into the cylinder of the engine is large, that is, when the engine is operating under a heavy load at a high speed, a part of the air introduced into the inlet passage portion is fed into the helical portion of the helically-shaped intake port via the bypass passage. This reduces the flow resistance of the helically-shaped intake port, thus, enabling high volumetric efficiency. As mentioned above, in the flow control device, since the vacuum operated diaphragm apparatus is used for actuating the flow control valve, a vacuum source is necessary for the diaphragm apparatus. In a gasoline engine, since vacuum is produced in the intake passage of the engine, such a vacuum source is easily available. However, in a diesel engine, since no throttle valve is arranged in the intake passage, vacuum is not produced in the intake passage. Therefore, a vacuum source cannot be easily obtained.

SUMMARY OF THE INVENTION

An object of the present invention is to provide a flow control device of a helically-shaped intake port, which is suitably applied to a diesel engine.

According to the present invention, there is provided a device for controlling the flow in a helically-shaped intake port of a diesel engine equipped with a suction pump which has a suction port and is driven by the diesel engine, said intake port comprising a helical portion formed around an intake valve, and a substantially straight inlet passage portion tangentially connected to the helical portion and having a helix terminating portion, said device comprising: a bypass passage branched off from the inlet passage portion and connected to the helix terminating portion of the helical portion; valve means arranged in said bypass passage for controlling the flow area of said bypass passage; vacuum operated apparatus having a vacuum chamber and connected to said valve means for actuating said valve means in response to a change in the level of vacuum produced in said vacuum chamber; and control means for selectively connecting said vacuum chamber to the suction port of said suction pump or the atmosphere in response to a change in the level of load of the diesel engine to open or close said valve means when the level of load of the engine is larger or smaller than a predetermined level, respectively.

The present invention may be more fully understood from the description of a preferred embodiment of the invention set forth below, together with the accompanying drawings.

BRIEF DESCRIPTION OF THE DRAWINGS

In the drawings

FIG. 10 is a view illustrating the entirety of a flow control device.

DESCRIPTION OF A PREFERRED EMBODIMENT

Figure 1:
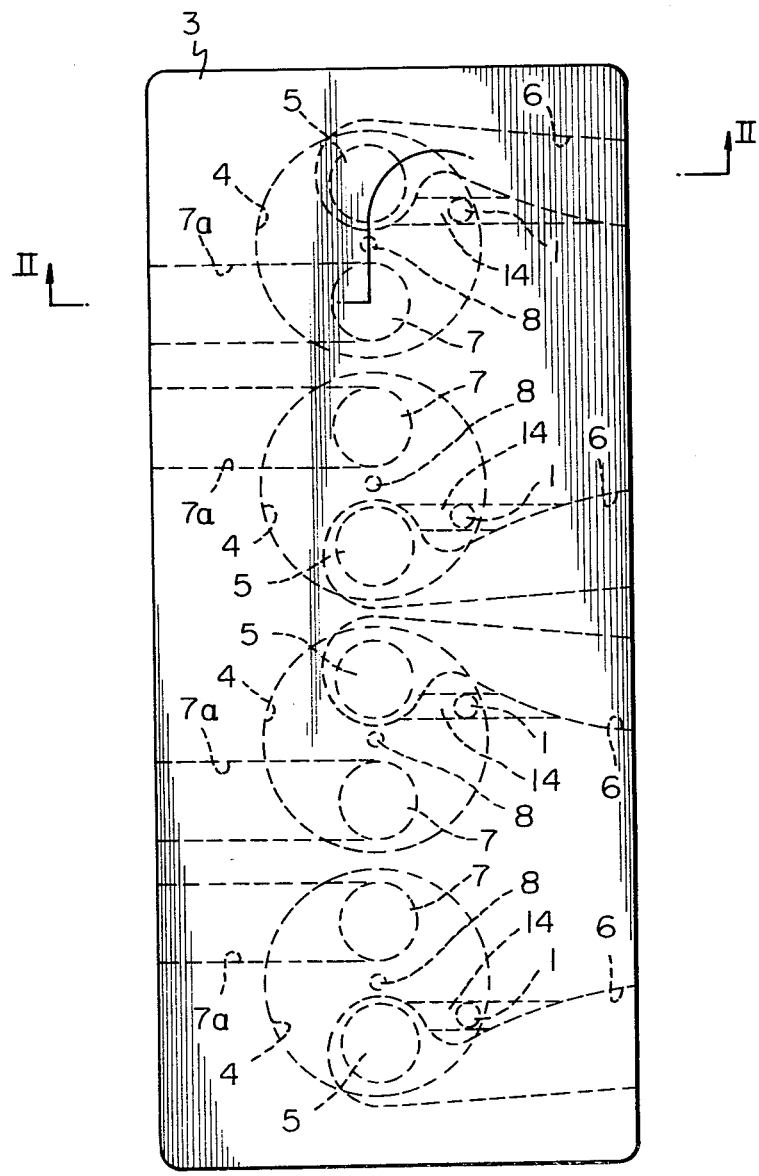
FIG. 1 is a plan view of a diesel engine according to the present invention.
Figure 2:
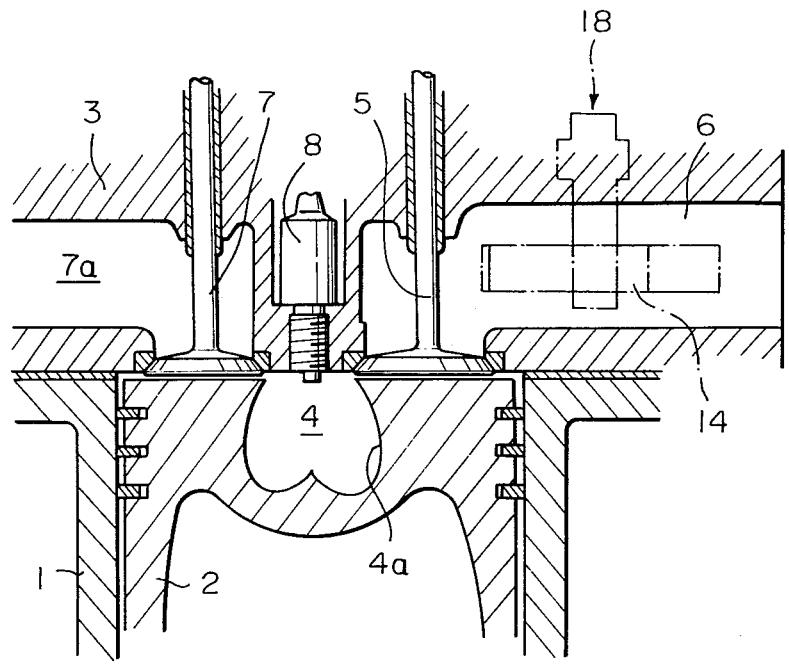
FIG. 2 is a cross-sectional view taken along the line II—II in FIG. 1.

Referring to FIGS. 1 and 2, reference numeral 1 designates a cylinder block, 2 a piston reciprocally movable in the cylinder block 1, 3 a cylinder head fixed onto the cylinder block 1, and 4a a spherical recess formed on the top face of the piston 2 and defining a combustion chamber 4; 5 designates an intake valve, 6 a helically-shaped intake port formed in the cylinder head 3, 7 an exhaust valve, and 7a an exhaust port, 8 designates a fuel injector arranged in the combustion chamber 4. Fuel is injected from the fuel injector 8 towards the spherical recess 4a.

Figure 3:
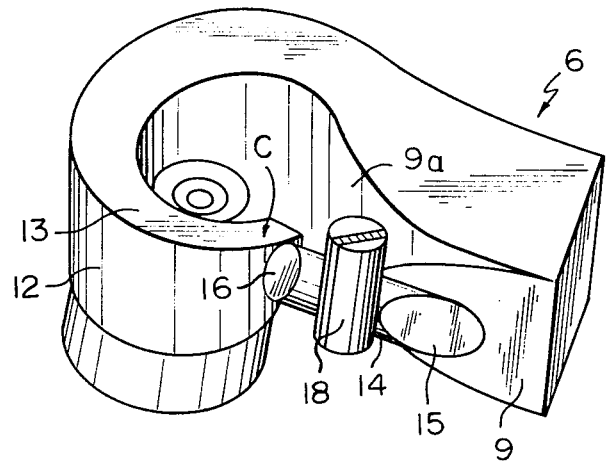
FIG. 3 is a perspective view schematically illustrating the shape of a helically-shaped intake port.
Figure 4:
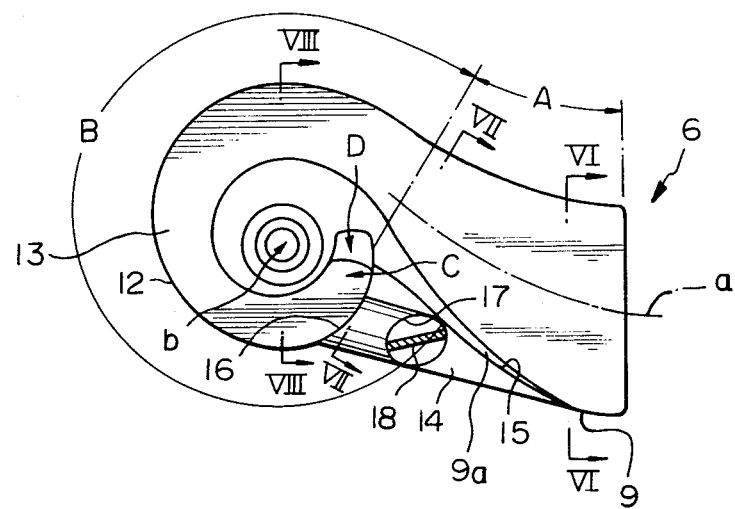
FIG. 4 is a plan view of FIG. 3.
Figure 5:
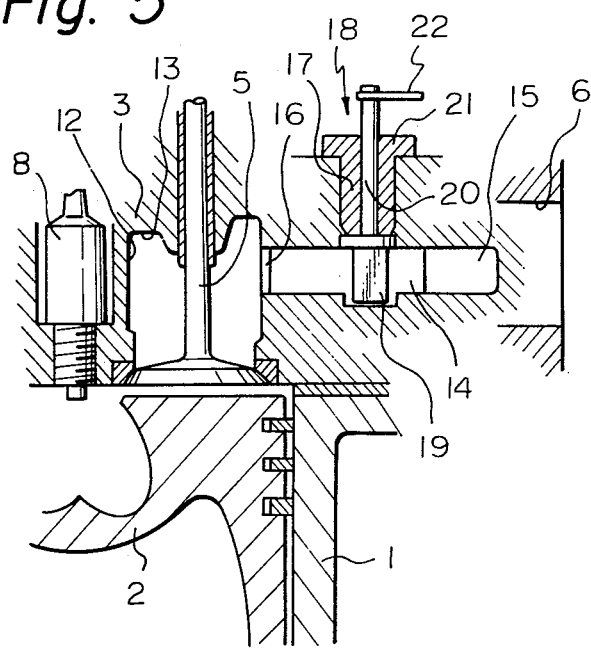
FIG. 5 is a cross-sectional view taken along the bypass passage in FIG. 3.
Figure 6:
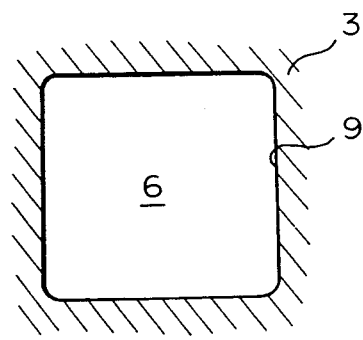
FIG. 6 is a cross-sectional view taken along the line VI—VI in FIG. 4.
Figure 7:
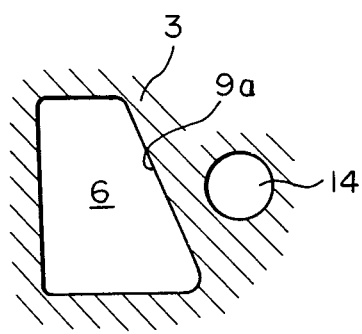
FIG. 7 is a cross-sectional view taken along the line VII—VII in FIG. 4.
Figure 8:
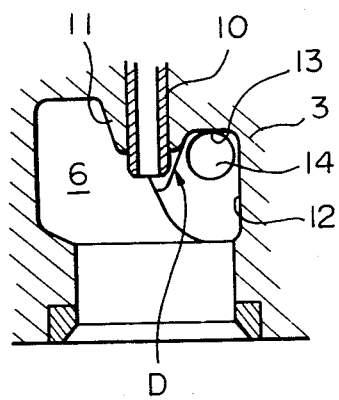
FIG. 8 is a cross-sectional view taken along the line VIII—VIII in FIG. 4.

FIGS. 3 through 5 schematically illustrate the shape of the helically-shaped intake port 6 illustrated in FIG. 2. As illustrated in FIG. 4, the helically-shaped intake port 6 comprises an inlet passage portion A the longitudinal central axis of which is slightly curved, and a helical portion B formed around the valve stem of the intake valve 5. The inlet passage portion A is tangentially connected to the helical portion B. As illustrated in FIGS. 3, 4, and 7, the side wall 9 of the inlet passage portion A, which is located near the helix axis b, has on its upper portion an inclined wall portion 9a which is arranged to be directed downwards. The width of the inclined wall portion 9a is gradually increased towards the helical portion B, and as is illustrated in FIG. 7, the entire portion of the side wall 9 is inclined at the connecting portion of the inlet passage portion A and the helical portion B. The upper half of the side wall 9 is smoothly connected to the circumferential wall of a cylindrical projection 11 (FIG. 2) which is formed on the upper wall of the intake port 6 at a position located around a valve guide 10 of the intake valve 5. The lower half of the side wall 9 is connected to the side wall 12 of the helical portion B at the helix terminating portion C of the helical portion B.

Figure 9:
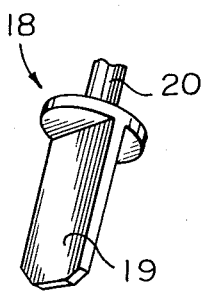
FIG. 9 is a perspective view of a rotary valve.

As illustrated in FIGS. 1 through 5, bypass passages 14, branched off the inlet passage portions A of the corresponding intake ports 6 and having a substantially uniform cross-section, are formed in the cylinder head 3, and each of the bypass passages 14 is connected to the helix terminating portion C of the corresponding intake port 6. Each of the inlet openings 15 of the bypass passages 14 is formed on the side wall 9 at a position located near the inlet open end of the inlet passage portion A of the corresponding intake port 6, and each of the outlet openings 16 of the bypass passages 14 is formed on the upper end portion of the side wall 12 at the helix terminating portion C of the corresponding intake port 6. In addition, valve insertion bores 17, extending across the corresponding bypass passages 14, are formed in the cylinder head 3, and rotary valves 18, each functioning as a flow control valve, are inserted into the corresponding valve insertion bores 17. The rotary valves 18 are arranged in the corresponding bypass passages 14, and as illustrated in FIG. 9, each of the rotary valves 18 comprises a thin plate-shaped valve body 19 and a valve shaft 20 formed in one piece on the valve body 19. As illustrated in FIG. 5, the valve shaft 20 is rotatably supported by a guide sleeve 21 fitted into the valve insertion bore 17. The valve shaft 20 projects upwardly from the top face of the guide sleeve 21, and an arm 22 is fixed onto the projecting tip portion of the valve shaft 20.

Referring to FIG. 10, the tip of the arm 22 fixed onto the top end of the valve shaft 20 is connected via a connecting rod 43 to a control rod 42 which is fixed onto a diaphragm apparatus 40. The diaphragm apparatus 40 comprises a vacuum chamber 44 separated from the atmosphere by the diaphragm 41, and a compression spring 45 for biasing the diaphragm 41 is inserted into the vacuum chamber 44. The vacuum chamber 44 is connected to a valve chamber 48 of a control valve 47 via a conduit 46, and the valve chamber 48 is opened to the atmosphere via an atmosphere port 49 and an air filter 50. The control valve 47 comprises a valve body 51 controlling the opening operation of the atmosphere port 49, a movable plunger 52 connected to the valve body 51, and a solenoid 53 for attracting the movable plunger 52.

As illustrated in FIG. 10, a vehicle comprises an accelerator pedal 60 arranged in the driver's compartment, a brake pedal 61 arranged in the driver's compartment, a fuel injection pump 62 controlled by the accelerator pedal 61, a brake booster 63 connected to the brake pedal 61, and a suction pump 64 driven by the engine. The suction port of the suction pump 64 is connected to the constant pressure chamber (not shown) of the brake booster 63 so that vacuum is continuously produced in the constant pressure chamber of the brake booster 63. The majority of diesel engines for use in load vehicles are provided with the suction pump 64 driven by the engine as mentioned above for continuously producing vacuum in the constant pressure chamber of the brake booster 63. As illustrated in FIG. 10, the valve chamber 48 of the control valve 47 is connected to the suction port of the suction pump 64 via a valve port 55 and a check valve 54 allowing only the outflow of air from the valve chamber 48 into the suction pump 64.

On the other hand, the solenoid 53 of the control valve 47 is connected to a power source 57 via switch 56 which is actuated by the accelerator pedal 60. The switch 56 is turned off, for example, when the depression of the accelerator pedal 60 is increased beyond a predetermined degree of depression, that is, when the level of load of the engine is increased beyond a predetermined level. When the switch 56 is turned off, since the solenoid 53 is de-energized, the valve body 51 closes the valve port 55 and opens the atmosphere port 49. As a result of this, since the pressure in the vacuum chamber 44 of the diaphragm apparatus 40 becomes equal to the atmospheric pressure, the diaphragm 41 moves towards the rotary valve 18 due to the spring force of the compression spring 45. Thus, the rotary valve 18 opens the bypass passage 14. On the other hand, when the level of load of the engine is reduced below the predetermined level, the switch 56 is turned on. At this time, since the solenoid 53 is energized, the valve body 51 opens the valve port 55 and closes the atmosphere port 49. Consequently, since air in the vacuum chamber 44 is sucked by the suction pump 64, vacuum is produced in the vacuum chamber 44. At this time, since the check valve 54 is present between the valve chamber 48 and the suction port of the suction pump 64, vacuum in the vacuum chamber 44 is maintained at a maximum vacuum which has been produced in the suction port of the suction pump 64. When vacuum is produced in the vacuum chamber 44, the diaphragm 41 moves towards the vacuum chamber 44 against the compression spring 45. Thus, the rotary valve 18 closes the bypass passage 14.

As mentioned above, when the engine is operating under a light load, the rotary valve 18 closes the bypass passage 14. At this time, the air introduced into the inlet passage portion A moves downward while swirling along the upper wall 13 of the helical portion B. Then, since the air while swirling flows into the combustion chamber 4, a strong swirl motion is created in the combustion chamber 4.

When the engine is operating under a heavy load, since the rotary valve 18 opens the bypass passage 14, part of the air introduced into the inlet passage portion A is fed into the helical portion B via the bypass passage 14 having a low flow resistance. Then, this introduced air comes collides head-on against the air stream flowing along the upper wall 13 of the helical portion B. As a result of this, since the air stream flowing along the upper wall 13 of the helical portion B is decelerated, the swirl motion is weakened. As mentioned above, when the engine is operating under a heavy load, since the rotary valve 18 opens, the entire flow area of the intake port 6 is increased, and the swirl motion is weakened, it is possible to obtain a high volumetric efficiency. In addition, by forming the inclined wall portion 9a, the flow direction of part of the air introduced into the inlet passage portion A is deflected downward. As a result of this, since the part of the air flows into the helical portion B along the bottom wall of the intake port 6 without swirling, the flow resistance of the intake port 6 becomes small, making it possible to further increase a volumetric efficiency when the engine is operating under a heavy load.

Conventional diesel engines are normally provided with a vacuum pump for the brake booster. In the present invention, by using such a vacuum pump as a vacuum source for actuating the diaphragm apparatus, it is possible to control the opening operation of the rotary valve without increasing the manufacturing cost of the flow control device in a diesel engine.

While the invention has been described with reference to a specific embodiment chosen for the purpose of illustration, it should be apparent that numerous modifications can be made thereto by those skilled in the art without departing from the spirit and scope of the invention.

We claim:

1. A device for controlling the flow in a helically-shaped intake port of a diesel engine equipped with a suction pump which has a suction port and is driven by the diesel engine, said intake port comprising a helical portion formed around an intake valve, and a substantially straight inlet passage portion tangentially connected to the helical portion and having a helix terminating portion, said device comprising:
   a bypass passage branched off from the inlet passage portion and connected to the helix terminating portion of the helical portion;
   valve means arranged in said bypass passage for controlling the flow area of said bypass passage;
   vacuum operated apparatus having a vacuum chamber and connected to said valve means for actuating said valve means in response to a change in the level of vacuum produced in said vacuum chamber; and
   control means for selectively connecting said vacuum chamber (A) to the suction port of said suction pump in response to a change in a level of load of the diesel engine to open said valve means when the level of load of the engine is larger than a predetermined level, and; (B) to atmosphere in response to a change in the level of load to close said valve means when the level of load is smaller than a predetermined level.

2. A device according to claim 1, wherein said bypass passage has an outlet opening which is open to the helical portion at a position near a top wall of the helical portion.

3. A device according to claim 1, wherein said vacuum operated apparatus comprises a diaphragm connected to said valve means and separating said vacuum chamber from the atmosphere.

4. A device according to claim 1, wherein said valve means comprises a rotary valve rotatably arranged in said bypass passage.

5. A device according to claim 4, wherein said rotary valve comprises a thin plate-shaped valve body extending through said bypass passage.

6. A device according to claim 1, wherein the intake passage portion has an inlet open end located furthest from the helical portion, said bypass passage having an inlet opening which is open to the inlet passage portion at a position near said inlet open end.

7. A device according to claim 6, wherein the intake passage portion comprises an upper wall, a bottom wall, a first side wall located near the intake valve and a second side wall located remote from the intake valve, said first side wall comprising a downwardly inclined portion located near the helical portion, and a substantially vertical portion located near said inlet open end, the inlet opening of said bypass passage being formed on said vertical portion.

8. A device according to claim 7, wherein the intake port comprises a valve guide projecting into the helical portion from an upper wall of the helical portion and having a circumferential wall, said downwardly inclined portion being tangentially connected to the circumferential wall of said valve guide.

9. A device according to claim 1, wherein said control means comprises a control valve selectively connecting said vacuum chamber to the suction port of said suction pump or the atmosphere, and an actuating device actuating said control valve in response to the level of load of the engine.

10. A device according to claim 9, wherein said control valve comprises a valve chamber connected to said vacuum chamber, a valve port interconnecting said valve chamber to the suction port of said suction pump, an atmosphere port interconnecting said valve chamber to the atmosphere, a valve body actuated by said actuating device and cooperating with said valve port and said atmosphere port for controlling the opening operation thereof, and a check valve arranged between said valve chamber and the suction portion of said suction pump.

11. A device according to claim 9, wherein said actuating device comprises an electromagnetic control valve, a power source, and a switch inserted between said electromagnetic control valve and said power source and actuated in response to a change in the level of load of the engine.

12. A device according to claim 11, wherein the engine has an accelerator pedal, and said switch is connected to and actuated by said accelerator pedal.

* * * * *